Figure 1:
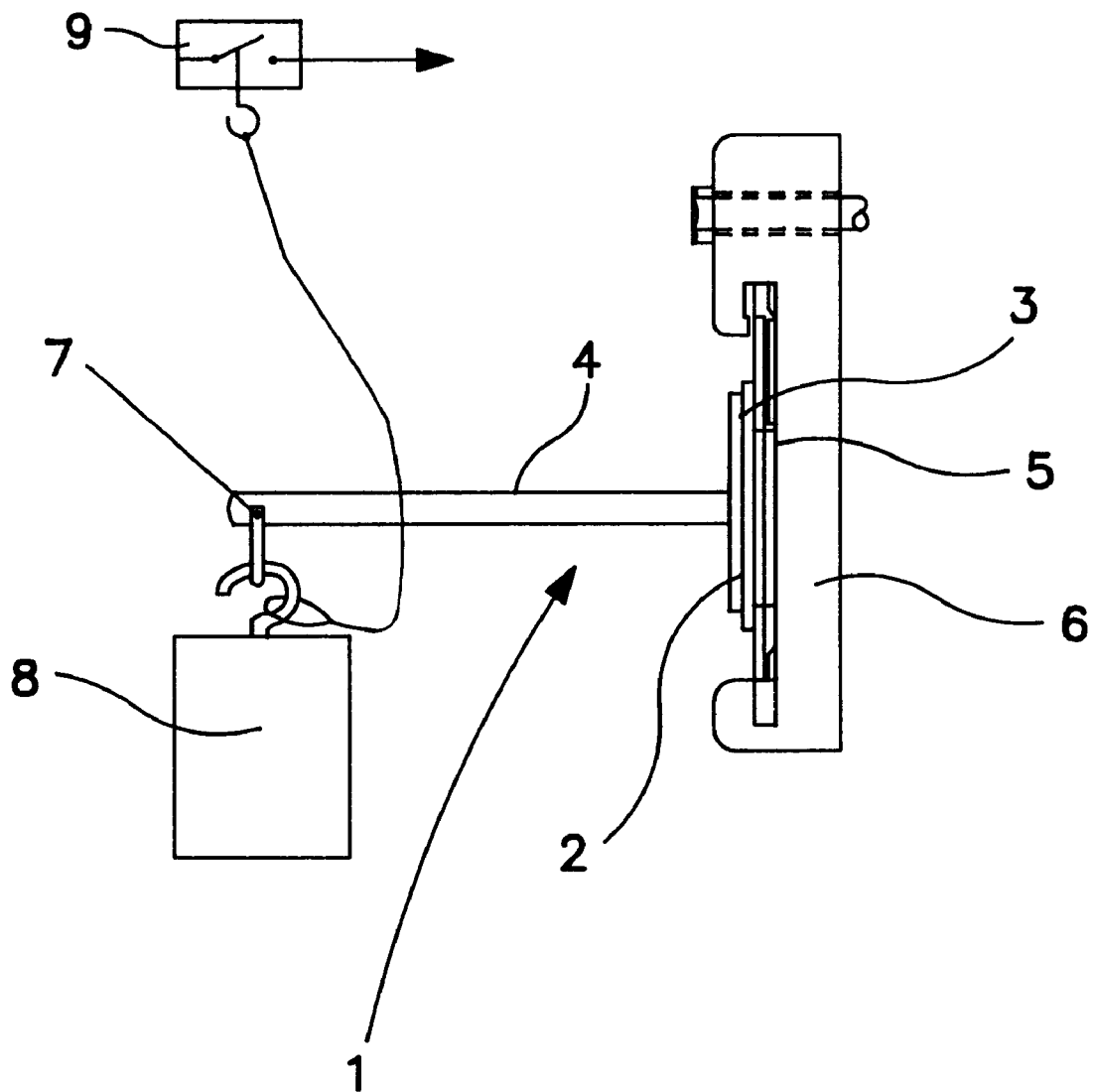

United States Patent [19]
Schacht et al.

[11] Patent Number: 6,117,531
[45] Date of Patent: Sep. 12, 2000

[54] SELF ADHESIVE TAPE

[75] Inventors: Wolfgang Schacht, Neu Wulmstorf; Robert Gereke, Hamburg; Frank Henke, Neu Wulmstorf/Elsdorf; Jochen Stähr, Hannover, all of Germany

[73] Assignee: Beiersdorf AG, Hamburg, Germany

[21] Appl. No.: 08/888,756

[22] Filed: Jul. 7, 1997

[30] Foreign Application Priority Data

Jul. 12, 1996 [DE] Germany .......................... 196 28 177

[51] Int. Cl.[7] .................................................. C09J 7/02
[52] U.S. Cl. ........................ 428/213; 428/219; 428/354; 428/355 AC
[58] Field of Search ........................... 428/354, 355 AC, 428/213, 219

[56] References Cited

U.S. PATENT DOCUMENTS

| | | | |
|---|---|---|---|
| 4,061,805 | 12/1977 | Thompson et al. | ................. 428/31 |
| 5,405,703 | 4/1995 | Chen | ................. 428/461 |
| 5,688,589 | 11/1997 | Schacht et al. | ................. 428/317.3 |

FOREIGN PATENT DOCUMENTS

| | | | |
|---|---|---|---|
| 3303834 A1 | 8/1984 | Germany | ............ C09J 7/02 |
| 19603919 A1 | 8/1996 | Germany | ............ C09J 7/02 |
| 8400130 | 1/1984 | WIPO | ............ B32B 25/02 |
| 9310177 | 5/1993 | WIPO | ............ C08K 5/06 |

*Primary Examiner*—Jenna Davis
*Attorney, Agent, or Firm*—Norris, McLaughlin & Marcus, P.A.

[57] ABSTRACT

Pressure-sensitive double-sided self-adhesive tape for permanent irreversible bonds, characterized in that the self-adhesive tape has a backing film based on rubbers having double bonds in the main chain, the rubbers being crosslinked such that they exhibit elastomeric behaviour, and a pressure-sensitive self-adhesive composition, based on an acrylate, which is coated on both sides of the backing film.

14 Claims, 1 Drawing Sheet

SELF ADHESIVE TAPE

The invention describes a double-sided self-adhesive tape as is employed in particular for achieving highly durable bonds, which can be maintained even at elevated temperatures, of articles with unevennesses in the surfaces to be bonded.

In order to obtain relatively high strengths relative to peeling and shear forces, the use of different adhesive tapes is known.

DE-C 21 05 877 indicates an adhesive tape which consists of a backing which is coated on at least one side with a microcellular pressure-sensitive adhesive and whose adhesive coat comprises a nucleating agent, the cells of the adhesive coat being closed and being distributed completely within the adhesive coat. This adhesive tape is able to adapt to the irregular surface onto which it is brought and is therefore able to lead to a relatively durable bond, but on the other hand exhibits only little recovery if compressed to half of the original thickness. However, the cavities in the adhesive composition offer, firstly, disadvantages in respect of the strength of the adhesive bond at elevated operating temperatures and, secondly, opportunities for lateral ingress of solvents and water into the adhesive join, which is highly undesirable. Furthermore, it is impossible to rule out the complete passage of solvents or water through the entire adhesive tape.

Thus DE-C 28 21 606 describes a pressure-sensitive adhesive tape having an adhesive coat on a carrier material in which hollow glass microspheres are dispersed with a proportion of up to 60 per cent by volume of the adhesive coat. Owing to its structure, this adhesive tape offers good strength relative to the abovementioned stresses. Since the tape possesses the technical advantage of showing virtually no lifting from sites of unevenness in the substrate, since it lacks elastic recovery after a pressure has been exerted on said tape for a period of time. However, this adhesive tape too has some disadvantages. For instance, hollow glass microspheres are highly sensitive entities, which, during incorporation into the adhesive coat, during storage but in particular when the tape is used, have a tendency to shatter, then creating follow-on problems owing to the splinters which are produced.

DE-A 40 29 896 describes an unbacked double-sided self-adhesive tape comprising a pressure-sensitive adhesive layer which contains solid glass microspheres.

DE-A 33 03 834 discloses a process for preparing an elastic, double-sided adhesive tape which has a backing of natural rubber. The adhesive coatings employed are likewise those based on natural rubber. Although such an adhesive tape is relatively inexpensive to prepare, it is of very little, if any, suitability for permanent high-performance bonds, especially in extreme temperature ranges.

The patents U.S. Pat. No. 4,440,829 and U.S. Pat. No. 4,061,805 disclose adhesive tapes which each have a backing of rubber, essentially a butyl rubber, which is coated with a pressure-sensitive adhesive and which as filler is provided with a pigment and plasticizer. Because of the insistence on butyl rubber and on rubbers of little or no elasticity, there are strength disadvantages of the adhesive bond with this adhesive tape, especially at elevated operating temperatures, owing to the fact that complete crosslinking of the polymer matrix is not possible. A permanent adhesive bond under severe stress and at an elevated temperature is not possible with the adhesive tapes disclosed; in such application the backing material flows and the bond between adhesive tape and object to be bonded is broken. Moreover, the electron beam crosslinking of butyl rubber when used as an adhesive-tape backing is not possible.

The patent U.S. Pat. No. 4,024,312 describes a self-adhesive tape which as backing film uses a film comprising an elastomeric and a thermoplastic composition. The elastomeric component consists essentially of linear or radial A-B-A block copolymers or mixtures of these linear or radial A-B-A copolymers with simple AB block copolymers, the A blocks originating from styrene or styrene homologues and the B blocks from conjugated dienes or lower alkenes. The adhesive layer used is a pressure-sensitive elastomeric composition of normal tack. This adhesive tape, however, is unsuitable for permanent bonds at elevated temperatures since, under these conditions, the softening of the styrene blocks leads naturally to flow of the overall system and thus to failure of the bond.

Instead, the adhesive tape of the invention is expressly suitable for easy redetachability through longitudinal extension.

All of the adhesive tapes mentioned have the common feature that the shear forces which can be accommodated and which act on the bonded connection are for many applications inadequate to ensure a permanent bond between the substrate and the article which is to be mounted by means of the adhesive tape. Therefore, especially at relatively low temperatures, and at elevated temperatures, the possibility of using such adhesive tapes is very limited. At low temperatures the backing becomes brittle, with the result that the adhesive tape is no longer able to maintain the desired adhesive bond. At elevated temperatures and under high mechanical stresses, if crosslinking of the backing is incomplete, weaknesses occur in the adhesive bond or, in the case of foamed backings, severe deformation occurs.

The object of the invention is to create a self-adhesive tape which does not have the disadvantages of the prior art, or at least not to the same extent, and which is nevertheless not limited in its utility like the prior products.

To achieve this object the invention proposes a pressure-sensitive self-adhesive tape coated on both sides with self-adhesive compositions based on an acrylate, which tape has a backing film based on rubbers having double bonds in the main chain, the rubbers being crosslinked such that they exhibit elastomeric behaviour.

As base material for the backing film, rubbers are employed. The rubbers in accordance with the invention are polymers with double bonds in the main chain, and in particular are either natural rubber, acrylonitrile-butadiene rubber or random styrene-butadiene rubber or a blend of these rubbers. Very particular preference is given to blends of natural rubber and random styrene-butadiene rubber.

The rubbers used for the backing film are, advantageously, crosslinked physically—for example by crosslinking using electron beams—or chemically.

To enhance the durability of the adhesive tape it can be filled using customary anti-ageing agents which, depending on the particular application, can come from the class of the discolouring or nondiscolouring antiageing agents, especially in the range 0–10 phr, and with known light stabilizers or ozone protection agents. Also possible is a blend with vulcanizing agents (for example peroxides or sulphur, sulphur donors or accelerators) and/or the addition of fatty acid, in particular in the range from 0 to 10 phr, and also the use of plasticizers.

In order to fine-tune the desired properties of the backing, it is possible if desired to use additional fillers. Thus the rubber can be treated with reinforcing, semireinforcing or nonreinforcing carbon blacks, in particular 0–80 phr, zinc oxide, in particular 0–70 phr, and/or other fillers, such as silica, silicates or chalk. In addition to the fillers mentioned it is also possible to use others. Furthermore, resins from the class of the phenolic resins and/or hydrocarbon resins can also be added in the range, in particular, of 0–75 phr.

All of these additives mentioned can, depending on the intended use of the self-adhesive tape, be employed either alone or in any desired combination with one another to prepare the rubber mixture, in order to obtain an optimum degree of harmonization with the application.

By using these additives it is also possible without problems to provide the backing with the black coloration which is generally called for by industry.

The backing film has a thickness of from 200 µm to 2000 µm, in particular from 400 µm to 1200 µm.

As a filler for modifying the properties of the backing it is possible to add, to the rubber formulation, solid microspheres with a volume proportion of from 1% by volume to 50% by volume, in particular from 10% by volume to 30% by volume. The solid microspheres present in the backing formulation bring about particularly advantageous properties of the novel self-adhesive tape if the solid microspheres concerned are solid glass microspheres having a diameter of from 1 µm to 100 µm, in particular from 10 µm to 60 µm and a density of from 1.8 g/cm$^3$ to 6.0 g/cm$^3$, in particular from 1.9 g/cm$^3$ to 4.0 g/cm$^3$.

The backing mixture is preferably prepared in an internal mixer which is typical for elastomer compounding. In this procedure, the rubber mixture is adjusted in particular to a Mooney value $ML_{1+3}$ (100° C.) in the range from 40 to 80. Processing is preferably carried out without solvent. If appropriate, the desired solid microarticles are added to the rubber mixture at the same time. The rubber mixture can then be extruded and/or calendered to the desired thickness on customary commercial machines, to give a thickness of the backing film which is within the abovementioned ranges.

Subsequently it is possible to crosslink the backing by means of electron beams or by means of known chemical crosslinkers.

Express reference is made to the known technology of rubber processing and to the known additives which are employed therefor, for instance in accordance with the book by Werner Kleemann (Werner Kleemann: "Mischungen für die Elastverarbeitung" [Mixtures for elastomer processing], Deutscher Verlag fur Grundstoffindustrie, Leipzig 1982).

In order to increase the anchoring of the adhesive composition on the rubber backing it is possible to add known adhesion promoters. An epoxy-based primer can also be applied to the backing film.

Alternatively, the backing can be subjected to a corona pretreatment. To obtain particularly firm anchoring, a combination of the methods indicated is also possible.

By using barrier layers, especially polyamide-based barrier layers, with a sufficient thickness of from 2 µm to 10 µm, preferably from 2 µm to 4 µm, it is possible to secure the functional capacity of the bond, even when migrating rubber chemicals are used in the backing formulation and when the bond is stored under elevated temperatures.

The pressure-sensitive self-adhesive composition preferably consists of conventional copolymers of n-butyl acrylate with 2-ethylhexyl acrylate and acrylic acid, preferably having a composition of from 60% by weight to 70% by weight of n-butyl acrylate, from 20% by weight to 40% by weight of 2-ethylhexyl acrylate and from 0% by weight to 8% by weight of acrylic acid.

The addition of further, known components is possible to obtain specific properties, especially the addition of crosslinkers, tackifier resins and antiageing agents.

The self-adhesive composition can be applied directly from the solution, dispersion or melt or in the transfer technique or by coextrusion with the backing. In the case of coextrusion in particular, in-line crosslinking of backing and adhesive composition by electron beam curing is advantageous. The application weight of the adhesive composition can likewise be chosen arbitrarily, depending on the intended use, within the range from 10 g/m$^2$ to 250 g/m$^2$, preferably from 40 g/m$^2$ to 150 g/m$^2$.

Because of the combination of the backing formulations and adhesive formulations described, the self-adhesive tape exhibits outstanding properties which were not foreseeable in such a way to the skilled worker, so that its use in a temperature range from −40° C. to 80° C. is possible, the advantages of the novel adhesive tape becoming particularly evident between 70 and 80° C.

Furthermore, owing to the very low glass transition point of the adhesive tape according to the invention, low-temperature applications down to −40° C. are possible, since the embrittlement otherwise observed with known adhesive tapes does not occur, so that even at these extreme temperatures optimum adhesion of the adhesive tape is ensured.

Because of high flexibility of the backing, the adhesive tape adapts very well to an uneven substrate provided it is pressed onto said substrate with a certain pressure. This produces a very permanent bond between adhesive tape and substrate, which does not fail even under high shear forces and bending moment stresses which act on the self-adhesive tape at various test temperatures. Owing to the lack of laterally open cavities in the backing, the possible penetration of solvents or water into the adhesive tape, with all of its known disadvantages, is also prevented.

The invention is used, for example, in the furniture industry where mirrors, strips or cover pieces are to be anchored permanently to the substrate.

Owing to the outstanding properties of the product, however, the use of the invention is not restricted to the example given. Instead, it is possible to use the adhesive tape in many sectors of industry as an assembly material, when the task at hand is to establish, on a relatively uneven surface, a secure bond between two parts consisting of very different materials.

The experimental setup is described in more detail below with reference to FIG. 1, this setup being used to test the high mechanical load-bearing capacity of the double-sided self-adhesive tape in accordance with the so-called wall hook test.

By means of a wall hook 1 in die form the self-adhesive tape 2 is subjected to a bending moment stress. The wall hook 1 consists of a square steel plate 3 made of V2A-grade steel with an edge length of 30 mm and a thickness of 3 mm. Fastened in the middle of the steel plate 3 is a cylindrical rod 4 as a lever arm, having a length of 90 mm and a diameter of 5 mm. The steel plate 3 is bonded using the self-adhesive tape 2 to be tested to a second steel plate 5 made of V2A-grade steel. The second steel plate 5 is located in an appropriately formed mount 6.

At the point 7 which is at a distance of exactly 90 mm from the bonded side of the steel plate 3 of the wall hook, a weight 8 which produces a lever force of 10 N is suspended from the circular rod 4.

The bonded surfaces of the steel plates 3 and 5 must be completely even and must be sanded finely using emery paper (FEPA grain 240). To protect the surface and avoid traces of grease on the surface, the steel plates 3 and 5 are to be stored in toluene. Prior to use, the steel plates 3 and 5 must be cleaned with acetone and then left to dry in air for five minutes.

Prior to the beginning of the wall hook test, the self-adhesive tape 2 must be conditioned at a temperature of 22° C. and 55% relative atmospheric humidity for 24 h.

The steel plate 3 is bonded to the steel plate 5 with the test self-adhesive tape 2, which has been cut precisely to size, and the bond is subjected to planar pressure for 1 minute at a pressure of 0.1 kN/cm$^2$.

The holding time in minutes is determined at 55% relative atmospheric humidity and at the three temperatures of 22° C., 40° C. and 70° C. In addition to the holding time, the deformation of the self-adhesive tape 2 is assessed.

If one of the bonds of the self-adhesive tape 2 to the steel plates 3 and 5 fails, the wall hook falls down together with the weight 8. This closes a contact in a contactor 9, so that the time elapsed between the beginning of the test and failure of one of the bonds—the holding time—is indicated precisely.

Unlike the previously known self-adhesive tapes, the novel self-adhesive tape achieves high stability times and, especially at elevated testing temperature, a minimum deformation of the backing and thus of the adhesive bond.

In the text below the invention will be described in more detail with reference to an example without wishing thereby to impose an unnecessary restriction on the invention.

EXAMPLE

The backing mixture is prepared in an internal mixer typical of those used for elastomer compounding. In this procedure the rubber mixture is adjusted to a Mooney value $ML_{1+3}$ (100° C.) of about 65.

| Component | proportion (phr) |
| --- | --- |
| Random styrene-butadiene rubber 23% sty | 80.0 |
| Natural rubber CV 50 | 20.0 |
| Carbon black N 660 | 25.0 |
| Reflective beads 50 μ (from Lindner) | 20.0 |
| Chalk, precipitated (Microsohl from Damman) | 25.0 |
| Anti-ageing agent Vulkanox SKF (from Bayer) | 2.0 |

The rubber mixture is then drawn out on a customary elastomer calender to give a rubber sheet having a thickness of 0.6 mm. To prevent blocking of the material, a nonwoven paper is inserted during winding.

The resulting backing material is subjected on both sides to electron beam crosslinking (100 kGy per side and an acceleration voltage of 350 kV).

After crosslinking, the backing has an elongation break of >500% and <1000% and a strength of >4N/mm$^{21}$, measured in the calender direction.

The crosslink backing is treated on both sides with an epoxy-based dispersion primer.

Finally, the material is coated in two steps on both sides with 60 g/m$^2$ per side of the polyacrylate composition Duroctac 280–1753 from National Starch using the transfer technique.

The double-sided adhesive tape, covered on one side with release paper, is distinguished by high adhesion coupled with high shear strength, and the adhesive bonds produced therewith possess an excellent low-temperature impact strength and mechanical load-bearing capacity, even at elevated test temperatures.

Table 1 compares the results of the above-described wall hook test for an adhesive tape according to the example given with the typical values of previously known self-adhesive tapes.

TABLE 1

Test results of the wall hook test: stability times and deformation of the self-adhesive tape

| Test temperature /weight | Self-adhesive tape as per the example | Previously known high-performance self-adhesive tapes | Previously known double-sided standard self-adhesive tapes |
| --- | --- | --- | --- |
| 22° C./10N | >10000' no deformation | >10000' no deformation | <100' severe deformation |
| 40° C./10N | >3000' no deformation | about 3000' slight deformation | <10' severe deformation |
| 70° C./10N | >2000' no deformation | <1500' slight deformation | could not be tested |

We claim:

1. Pressure-sensitive double-sided self-adhesive tape for permanent irreversible bonds, wherein the self-adhesive tape has a backing film based on rubbers having double bonds in the main chain, which have been crosslinked and exhibit elastomeric properties, and a pressure-sensitive self-adhesive composition, based on an acrylate, which is coated on both sides of the backing film, and wherein a barrier layer having a thickness from 2 μm to 10 μm is present between the backing film and the self-adhesive composition.

2. Self-adhesive tape according to claim 1, wherein the pressure-sensitive self-adhesive composition is comprised of a copolymer of n-butyl acrylate with 2-ethylhexyl acrylate and acrylic acid, having a composition of from 60% by weight to 70% by weight of the n-butyl acrylate, from 20% by weight to 40% by weight of the 2-ethyihexyl acrylate and from 0% to 8% by weight of the acrylic acid.

3. Self-adhesive tape according to claim 1, wherein the rubbers used for the backing film are a natural rubber, an acrylonitrile-butadiene rubber, a random styrene-butadiene rubber or a blend of these rubbers.

4. Self-adhesive tape according to claim 1, wherein the rubbers used for the backing film are blended with one or more additives selected from the group consisting of anti-ageing agents, crosslinkers, light stabilizers, ozone protection agents, fatty acids, resins, plasticizers and vulcanizing agents; and the rubbers used for the backing film are crosslinked chemically or physically.

5. Self-adhesive tape according to claim 1, wherein the backing film is filled with one or more fillers selected from the group consisting of carbon black, zinc oxide, silica, silicates and chalk.

6. Self-adhesive tape according to claim 1, wherein the backing film has a thickness of from 200 μm to 2000 μm.

7. Self-adhesive tape according to claim 1, wherein the backing film contains solid microspheres in a proportion by volume of from 1% by volume to 50% by volume.

8. Self-adhesive tape according to claim 7, wherein the solid microspheres are glass.

9. Self-adhesive tape according to claim 8, wherein the solid glass microspheres have a diameter of from 1 μm to 100 μm, and a density of from 1.8 g/cm$^3$ to 6.0 g/cm$^3$.

10. Self-adhesive tape according to claim 1, wherein the backing film has an adhesion-promoting primer on both sides.

11. Self-adhesive tape according to claim 1, wherein the backing film has adhesion promoters in order to improve the adhesion of the adhesive compositions.

12. Self-adhesive tape according to claim 1, wherein the barrier layer is a polyamide barrier layer.

13. Self-adhesive tape according to claim 1, wherein the self-adhesive tape is applied to the backing film with a weight per unit area of from 10 g/m² to 250 g/m².

14. A method for obtaining permanent bonds with high shear strength, high adhesion and high low-temperature impact strength in a temperature range from −40° C. to 80° C., which comprises forming said permanent bonds with the self-adhesive tape of claim 1.

* * * * *